US012569791B2

(12) United States Patent
Wandres

(10) Patent No.: US 12,569,791 B2
(45) Date of Patent: Mar. 10, 2026

(54) VARIABLE INSTALLATION IN A GAS FLOW CHANNEL

(71) Applicant: Munters Euroform GmbH, Aachen (DE)

(72) Inventor: Peter Wandres, Aachen (DE)

(73) Assignee: Munters Euroform GmbH, Aachen (DE)

( * ) Notice: Subject to any disclaimer, the term of this patent is extended or adjusted under 35 U.S.C. 154(b) by 610 days.

(21) Appl. No.: 17/799,367

(22) PCT Filed: Feb. 9, 2021

(86) PCT No.: PCT/DE2021/000023
§ 371 (c)(1),
(2) Date: Aug. 12, 2022

(87) PCT Pub. No.: WO2021/160198
PCT Pub. Date: Aug. 19, 2021

(65) Prior Publication Data
US 2023/0338882 A1     Oct. 26, 2023

(30) Foreign Application Priority Data
Feb. 12, 2020     (DE) .......................... 102020000892.5

(51) Int. Cl.
*B01D 53/14*     (2006.01)
*B01D 45/10*     (2006.01)
*F23J 15/04*     (2006.01)

(52) U.S. Cl.
CPC ............. *B01D 45/10* (2013.01); *B01D 53/14* (2013.01); *B01D 53/1406* (2013.01); *F23J 15/04* (2013.01)

(58) Field of Classification Search
CPC ............................ B01D 53/14; B01D 53/1406
See application file for complete search history.

(56) References Cited

U.S. PATENT DOCUMENTS

| | | | |
|---|---|---|---|
| 3,592,452 A | 7/1971 | Katyal | |
| 4,698,078 A | 10/1987 | Mavros | |
| 5,230,725 A * | 7/1993 | Chowaniec | B01D 45/16 55/443 |

FOREIGN PATENT DOCUMENTS

| | | |
|---|---|---|
| DE | 202011004282 U1 | 7/2011 |
| EP | 0864345 A1 | 9/1998 |

(Continued)

OTHER PUBLICATIONS

PCT/DE2021/000023; International Search Report and Written Opinion; Date of Mailing Apr. 15, 2021.

(Continued)

*Primary Examiner* — Robert A Hopkins
(74) *Attorney, Agent, or Firm* — Barclay Damon LLP

(57)     ABSTRACT

An installation in a gas flow channel includes a first layer of rod-shaped elements positioned at a distance from one another along a plane transverse to a direction of gas flow and a second layer of rod-shaped elements offset relative to the first layer. The second layer of rod-shaped elements is positioned at a distance from one another along the plane transverse to the direction of gas flow. The of rod-shaped elements extend across the gas flow channel. The second layer is structured to move relative to the first layer to define at least one of: (i) one or more additional operating positions; and (ii) an out-of-phase position.

12 Claims, 3 Drawing Sheets

(56)            References Cited

FOREIGN PATENT DOCUMENTS

| | | | |
|---|---|---|---|
| EP | 2687281 | A1 | 1/2014 |
| JP | 1979-16371 | | 2/1979 |
| JP | 1981-21621 | | 2/1981 |
| JP | 1987-103417 | | 7/1987 |
| JP | H05115702 | A * | 5/1993 |
| JP | 2000-279730 | A | 10/2000 |
| JP | 2009-506887 | | 2/2009 |
| JP | 1998-216436 | A | 8/2009 |
| JP | 2009-178709 | A | 8/2009 |
| JP | 1979-29148 | B2 | 2/2014 |
| JP | 2014-176789 | A | 9/2014 |
| WO | 2015039779 | A1 | 3/2015 |

OTHER PUBLICATIONS

PCT/DE2021/000023; English Translation of International Search Report; Date of Mailing Apr. 15, 2021.
CN 202180013740.7; Filed Feb. 9, 2021; Notification of the First Office Action; Date of Notification Aug. 14, 2023 (9 pages).
CN 202180013740.7; Filed Feb. 9, 2021; English translation of Notification of the First Office Action; Date of Notification Aug. 14, 2023 (8 pages).
PCT/DE2021/000023; English Translation of International Preliminary Report on Patentability; Date of Mailing Jun. 1, 2022 (6 pages).
Japanese Patent Office, Notice of Reasons for Refusal w/English translation attached in Japanese Patent Application No. P2022-547079, mailed Nov. 28, 2023.
European Patent Office, Ground of Appeal in EP21712946.9 (Pub. No. EP 4103301 B1), as published on Dec. 2, 2024.

* cited by examiner

VARIABLE INSTALLATION IN A GAS FLOW CHANNEL

CROSS REFERENCE TO RELATED INVENTION

This application is a national stage application pursuant to 35 U.S.C. § 371 of International Application No. PCT/DE2021/00023, filed on Feb. 9, 2021, which claims priority to, and benefit of, German Patent Application No. 20201000892, filed Feb. 12, 2020, the entire contents of which are hereby incorporated by reference.

TECHNOLOGICAL FIELD

The present invention relates to an installation in a gas flow channel with a first layer, and a second layer offset relative thereto, made of horizontal rod-shaped elements disposed at a distance from one another in a plane transverse to the gas flow direction, said elements extending transversely across the gas flow channel.

BACKGROUND

Installations have been used in the demister sector for a long time, predominantly as wire knit meshes, but also as rod or tube coalescers. Limit droplets of up to approx. 3 μm can be achieved with these coalescers. The smaller the limit droplets the larger their pressure loss. Furthermore, such tube coalescers have also been used for dust scrubbing. In this method, the coalescers are continuously supplied with water.

The pressure loss of such a tube coalescer can be up to ten times greater than the pressure loss of a demister. Accordingly, using a continuously operated tube coalescer would result in very high energy consumption, although this is not necessary in many cases. Since the corresponding installation is fixedly disposed in the gas flow channel, the installation formed as two-layered must be automatically "carried along", although this is not necessary in these cases. Therefore, it would make sense for such an installation to only exercise its function when necessary, for example a dust load arises in the gas flow (exhaust air).

A service-optimized demister for flue gas desulfurization systems with tubular impact bodies is known from DE 20 2011 004 282 U1, wherein the at least one roller module per separator path is foldably hung. These measures serve to facilitate inspection and maintenance of the roller separator. In other words, the tube separator can be folded up in its out-of-operation position. A man can carefully fold the module upward for inspection and maintenance A gap opens up thereby, through which the employee can reach the inside of the intermediate space between the two separator layers. There he can perform inspections or carry out work. A movement of the corresponding installation during operation of the system is not possible.

The object of the present invention is to provide an installation of the type described at the outset which can be operated especially efficiently.

BRIEF SUMMARY OF THE INVENTION

According to the invention in an installation of the type indicated, this object is solved in that it comprises an apparatus for moving the second layer relative to the first layer, or the first layer relative to the second layer, from a first operating position into additional operation positions, and/or an out-of-operation position by displacing the layer parallel to the axis of the gas flow channel, horizontally thereto, and/or by tilting.

In the solution according to the invention, during operation the two layers of the installation are located at a distance from one another in the gas flow channel, wherein the rod-shaped elements of the first layer are arranged offset relative to the rod-shaped elements of the second layer. In this context, it is presumed that this is an optimal operating position. If a layer is then to assume another operating position or an out-of-operation position, it is moved into this changed position by the provided movement apparatus. For example, the distance between the two layers, or for example the overlapping of the rod-shaped elements of the two layers, can be changed thereby. In any case, the corresponding layer can also be moved into an out-of-operation position, wherein it does not exercise any function, or only exercises a reduced function. This can be the case, for example, if the function of a coalescer layer is no longer required in order to save corresponding energy in this manner.

In an embodiment, both layers of the installation can therefore be moved relative to one another so that optimized operating positions result, or one layer is placed completely out of operation.

The installation according to the invention can be formed as a coalescer, for example. In this context, tubes are preferably used as rod-shaped elements, said tubes being disposed at certain distances from one another in order to produce a desired coalescer effect. The rods or tubes of the two layers are disposed offset relative to one another, i.e. they overlap one another in the gas flow direction so that the desired deflection effects of the gas flow are achieved. In this context, the distances of the layers from one another or the distances of the elements of the two layers (degrees of overlap) can be varied according to the invention.

In another embodiment, the installation is formed as a mass transfer tray. Such mass transfer trays are aggregated from so-called trays that are formed either as sieve tray or from offset rows of tubes. Due to the high resistance of the trays with the fluid coming from above, the gas here flows from below through the trays and forms a bubble layer above the trays, wherein a very intensive mass transfer takes place. The SO2 separation efficiency is significantly improved thereby, however at the cost of higher energy consumption. The installation according to the invention can serve to reduce the energy consumption over time, if the function of the trays constructed from rows of tubes is only switched on when needed. The installation formed according to the invention is preferably part of a flue gas scrubber.

In another embodiment, the installation has an apparatus for detecting a parameter, and a control unit that processes a signal received from the parameter detection apparatus, and controls the movement apparatus in dependence thereon in order to bring the first or second layer into the additional operating position or out-of-operation position.

In the simplest case, the movement apparatus can be manually switched on and off if, for example, it is desired to take one layer out of operation. This process can be automated if a sensor detects a parameter that is forwarded to a control unit which actuates the movement apparatus. An embodiment wherein the parameter detection apparatus detects a parameter of the gas flow is especially preferred. For example, in this context the dust load, the SO2 content, etc. of the gas flow are measured via a sensor that then forwards its signal to the control unit.

The control unit itself can compare a signal received from the parameter detection apparatus to a threshold value, and to actuate the movement apparatus in dependence upon this comparison.

As mentioned in the preceding, the movement apparatus can move a layer of the installation parallel to the axis of the gas flow channel, transverse thereto, and/or by tilting. In this context, in the first case, the distance between the two layers of the installation is enlarged or reduced. If the distance is enlarged starting from an optimal position, the moved layer is ultimately moved into an out-of-operation position, so that an agglomeration effect can no longer occur. On the one hand, a movement of the layer vertical to the axis of the gas flow channel causes the layer to laterally drive out of the gas flow channel, and on the other hand, to an offset in a direction that is changed by 90°, wherein the overlap of the rod-shaped elements of the two layers is changed. If the rod-shaped elements are disposed flush in a vertical direction, an out-of-operation position is also reached, since then deflection of the gas flow no longer occur. In any case, the movement apparatus formed according to the invention provides for at least these three movement types, and additionally, a tilting out of the layer from the gas flow channel.

As regards the design of the movement apparatus itself, it preferably comprises water-operated hydraulic cylinders. These water-operated hydraulic cylinders can be coupled with a flushing apparatus for the installation, so that upon a commissioning of the flushing apparatus, the movement apparatus for a layer is simultaneously actuated. This applies especially in cases when the coalescer or the mass transfer tray is continuously flushed. If it is only a demister cleaning (1 min/hour), it naturally does not make sense to displace the coalescer for this time only. In this case, the hydraulic cylinders must be controlled independently from the demisters but still with the same medium. The advantage of water as an operating means is that it is used regardless for flushing the installation, and therefore a layer can be simultaneously displaced upon switching the flushing on and off.

In a tiltable mounting of a layer via a joint, the folding out and in can take place with the aid of water hydraulic cylinders.

The lateral offset of the layers relative to one another, so that during operating these are aligned with one another without function, and in another case, are disposed offset relative to one another, can equally take place with water hydraulic cylinders.

With the solution according to the invention, it is possible to set a distance of the two layers from one another by cooperation of the parameter detection apparatus (sensors), the control unit, and the movement apparatus. Similar applies to the overlap of the rod-shaped elements of the two layers. Optimized settings of the installation, which for example can act as a coalescer, can be achieved in this manner.

The installation formed according to the invention relates to a gas flow that can be loaded with solid particles or with liquid particles. Moreover, the invention relates to trays that are formed with tubes or rods.

The installation described here can be used in gas flow channels in connection with downstream demisters, for example, vane eliminators. The installation has at least a first and a second layer, wherein it is understood that a plurality of layers can also be disposed.

BRIEF DESCRIPTION OF THE DRAWINGS

The is explained in detail in the following based on exemplary embodiments in connection with the drawing. The drawings show.

DETAILED DESCRIPTION OF THE INVENTION

Figure 1:
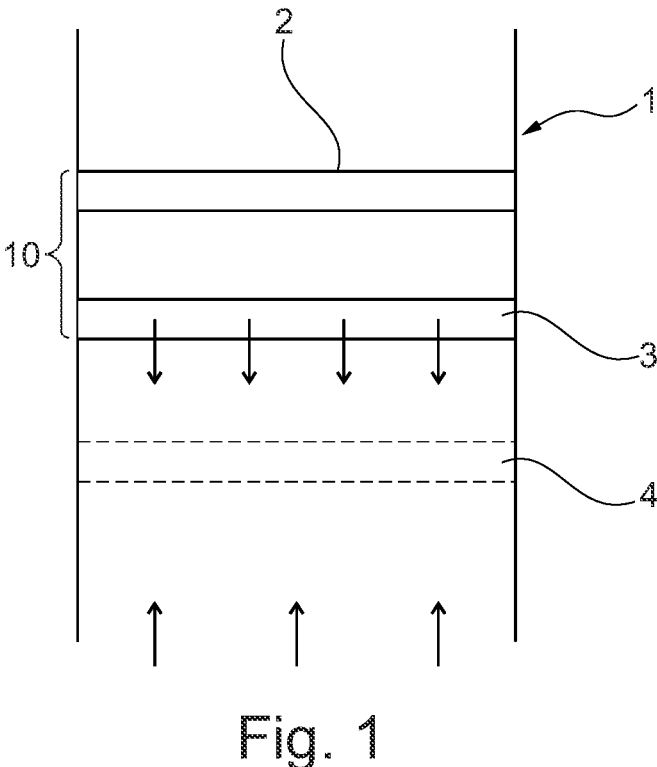
FIG. 1 schematically depicts a lateral view of an embodiment of a gas flow channel that is equipped with an installation.

FIG. 1 schematically shows a gas flow channel 1 of a flue gas scrubber system. An installation 10 is located in the gas flow channel 1, wherein said installation 10 is a coalescer that comprises of a first (upper) layer 2 of rod-shaped elements disposed parallel to one another, and a second (lower) layer 3 of rod-shaped elements disposed parallel to one another. In this context, the rod-shaped elements of the first layer 2 and the second layer 3 are disposed offset to one another, so that they overlap in the gas flow direction (from below to above), and a curved flow path is formed between them.

In this embodiment, the second lower layer 3 of the coalescer is movably disposed. As indicated by the arrows, it can be moved downward from the position indicated by solid lines to a position 4, which is indicated in dotted lines. When the second layer is located in the lower position 4, the two layers 2, 3 have a larger distance from one another that corresponds to an out-of-operation position. Therefore, if the coalescer is to be taken out of operation, the lower layer 3 is moved downward to position 4 by a movement apparatus not shown here.

Figure 2:
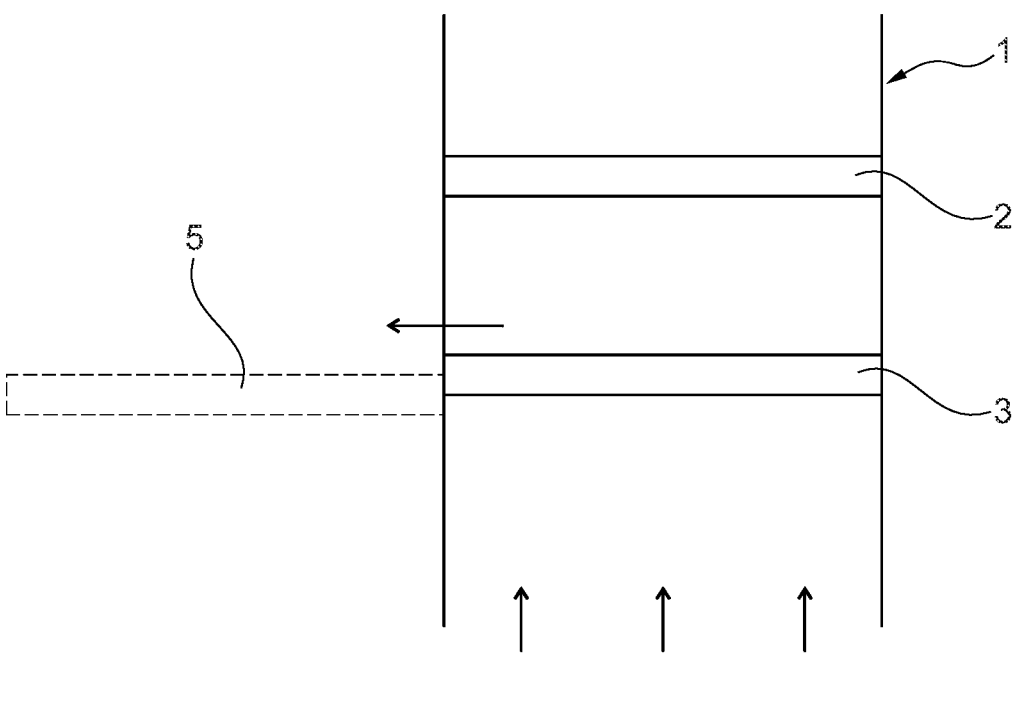
FIG. 2 schematically depicts a lateral view of another embodiment of an installation.

In the embodiment of FIG. 2, an installation is equally provided that is formed as a coalescer and has a first upper layer 2 as well as a second lower layer 3. Both layers are aggregated from rod-shaped elements disposed next to one another at a distance, in this case tubes. In this context, to bring the second layer 3 into an out-of-operation position, the layer is moved laterally out of the gas flow channel 1, as represented by the dotted lines in 5.

Figure 3:
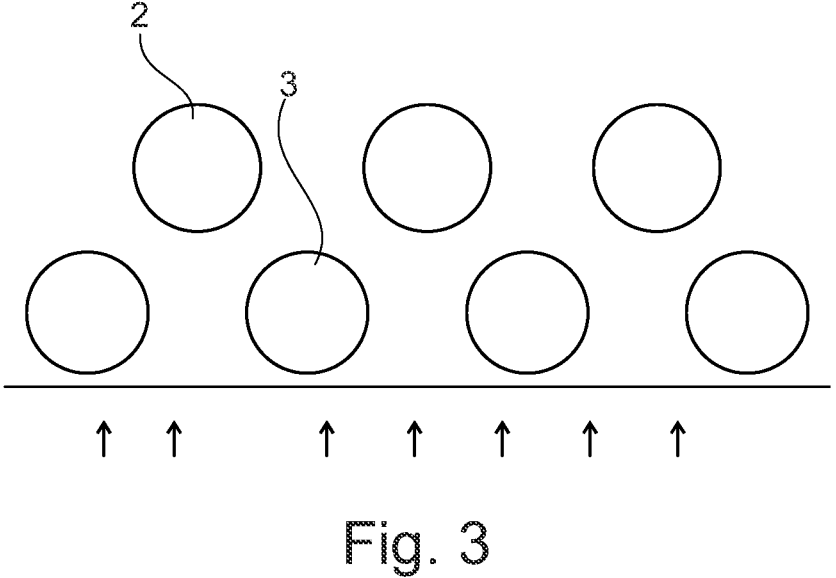
FIG. 3 schematically illustrates a view another exemplary embodiment of an installation offset by 90° relative to FIGS. 1 and 2.
Figure 4:
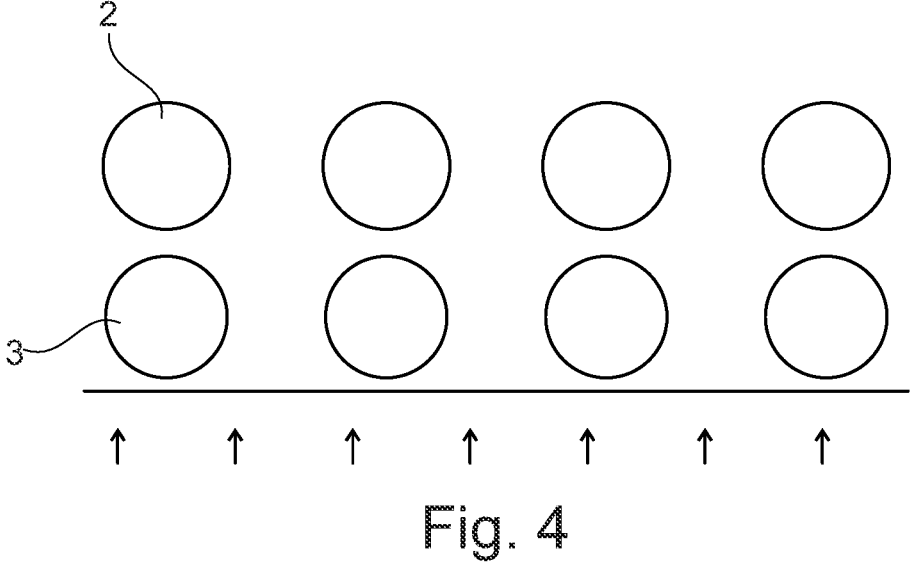
FIG. 4 schematically illustrates the embodiment of FIG. 3 following the movement of the lower layer of the coalescer.

In the embodiment shown in FIGS. 3 and 4, the rod-shaped elements of the second lower layer 3 are moved vertical to the axis of the flow channel 1 in the drawing plane from left to right, so that the overlap of the rod-shaped elements of the two layers 2, 3 becomes zero. When the rod-shaped elements of the two layers align, the installation is placed out-of-operation since flow deflection can no longer occur.

Figure 5:
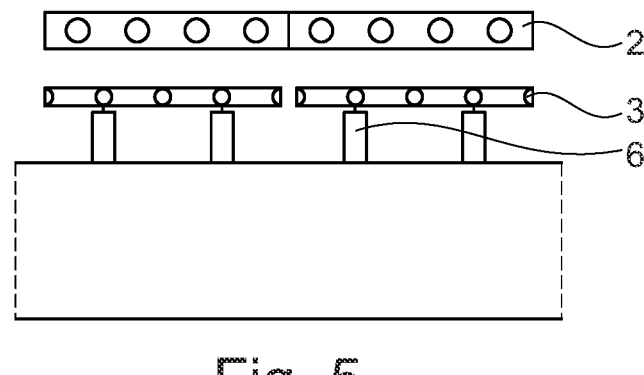
FIG. 5 schematically illustrates another lateral view of the embodiment of FIG. 1.
Figure 6:
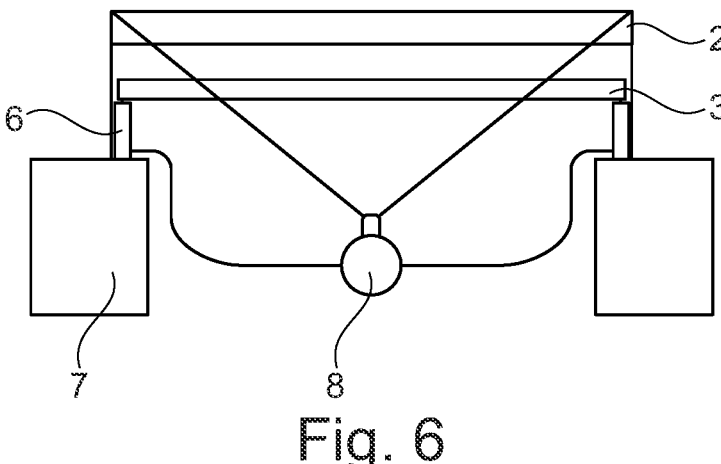
FIG. 6 schematically illustrates a lateral view of the embodiment of FIG. 1 rotated by 90°.
Figure 7:
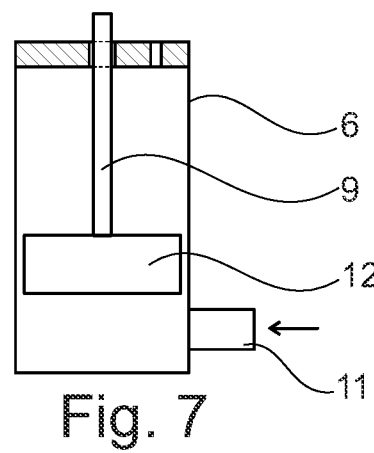
FIG. 7 schematically illustrates a plane view of an embodiment of a hydraulic cylinder.

FIGS. 5 to 7 show the first embodiment shown in FIG. 1 in more precise depictions. FIG. 5 shows four hydraulic cylinders 6 that are arranged under the second layer 3 and move it parallel to the axis of the flow channel. FIG. 6 shows the mounting of the installation on support holders 7, on which the hydraulic cylinders 6 are disposed, which support the second lower layer 3 of the installation. Furthermore, a nozzle tube 8 is shown, which serves to continuously spray the installation via hoses. Additional hoses lead from the nozzle tube 8 to the hydraulic cylinders 6.

FIG. 7 shows a hydraulic cylinder 6 in detail with a plunger rod 9 and a plunger 12, as well as a water intake 11.

This embodiment is formed so that upon switching on the flushing (via the nozzle 8), the lower layer 3 is raised above the hydraulic cylinder 6 once the pressure is present in the hydraulic cylinders. This is typically 2 bar. In this state, the tube coalescer shown here has a small limit droplet and the associated pressure loss. Once the flushing is stopped, the lower layer 3 moves back to its starting position. The tube coalescer then has low pressure loss and a large limit droplet. The moving back to the starting position ideally takes place via the own weight of the lower layer 3. If this is not sufficient, it can naturally also be realized via a second water connection in the hydraulic cylinder 6. Then however a second inlet to the hydraulic cylinders would have to be laid from the outside.

The invention claimed is:

1. An installation in a gas flow channel comprising:
a first layer comprising rod-shaped elements positioned at a distance from one another along a plane transverse to a gas flow direction; and
a second layer offset relative to the first layer, the second layer comprising rod-shaped elements positioned at a distance from one another along a plane transverse to the gas flow direction,
wherein the rod-shaped elements are configured to extend across the gas flow channel,
wherein the second layer is configured to move relative to the first layer to define at least one of: (i) one or more additional operating positions; and (ii) an out-of-operation position,
wherein the second layer is configured to move in a direction parallel to the gas flow direction, and
wherein the rod-shaped elements of at least one the first layer and the second layer comprise a tubular shape.

2. The installation according to claim 1, wherein the second layer is configured to move in a vertical direction relative to the gas flow direction.

3. The installation according to claim 1, wherein the installation is configured as a coalescer.

4. The installation according to claim 1, wherein the installation is configured as a mass transfer tray comprising the first layer and the second layer and including offset rows of rod-shaped elements.

5. The installation according to claim 1, wherein the parameter is a parameter of the gas flow.

6. The installation according to claim 1, wherein a control unit is configured to compare a signal received from an apparatus configured to detect a parameter with a predetermined threshold value before the movement of the second layer occurs.

7. The installation according to claim 1, wherein the movement of the second layer is performed using one or more water-operated hydraulic cylinders.

8. An installation in a gas flow channel comprising:
a first layer comprising rod-shaped elements positioned at a distance from one another along a plane transverse to a gas flow direction;
a second layer offset relative to the first layer, the second layer comprising rod-shaped elements positioned at a distance from one another along a plane transverse to the gas flow direction;
an apparatus configured to detect a parameter and transmit a signal; and
a control unit configured to process the signal received from the apparatus and control movement of the second layer according to the signal, wherein the rod-shaped elements are configured to extend across the gas flow channel,
wherein the second layer is configured to move relative to the first layer to define at least one of: (i) one or more additional operating positions; and (ii) an out-of-operation position, and
wherein the second layer is configured to move in a direction parallel to the gas flow direction.

9. An installation in a gas flow channel comprising:
a first layer comprising rod-shaped elements positioned at a distance from one another along a plane transverse to a gas flow direction; and
a second layer offset relative to the first layer, the second layer comprising rod-shaped elements positioned at a distance from one another along a plane transverse to the gas flow direction,
wherein the rod-shaped elements are configured to extend across the gas flow channel,
wherein the second layer is configured to move relative to the first layer to define at least one of: (i) one or more additional operating positions; and (ii) an out-of-operation position,
wherein the second layer is configured to move in a direction parallel to the gas flow direction,
wherein the movement of the second layer is performed using one or more water-operated hydraulic cylinders, and
wherein the one or more water-operated hydraulic cylinders are coupled to a flushing apparatus.

10. A flue gas scrubber system comprising:
a gas flow channel; and
an installation positioned in the gas flow channel and comprising,
a first layer of rod-shaped elements positioned at a distance from one another along a plane transverse to a direction of gas flow, and
a second layer of rod-shaped elements offset relative to the first layer and positioned at a distance from one another along the plane transverse to the direction of gas flow,
wherein the rod-shaped elements are configured to extend across the gas flow channel, and
wherein the second layer is configured to move relative to the first layer to define at least one of: (i) one or more additional operating positions; and (ii) an out-of-operation position,
wherein the second layer is configured to move in a direction parallel to the gas flow direction, and
wherein the rod-shaped elements of at least one the first layer and the second layer comprise a tubular shape.

11. A flue gas scrubber system comprising:
a gas flow channel;
an installation positioned in the gas flow channel and comprising,
a first layer of rod-shaped elements positioned at a distance from one another along a plane transverse to a direction of gas flow, and
a second layer of rod-shaped elements offset relative to the first layer and positioned at a distance from one another along the plane transverse to the direction of gas flow;
an apparatus configured to detect a parameter and transmit a signal; and
a control unit configured to process the signal received from the apparatus and control movement of the second layer according to the signal, wherein the rod-shaped elements are configured to extend across the gas flow channel, and wherein the second layer is configured to move relative to the first layer to define at least one of: (i) one or more additional operating positions; and (ii) an out-of-operation position, wherein the second layer is configured to move in a direction parallel to the direction of the gas flow.

12. A flue gas scrubber system comprising:

a gas flow channel; and an installation positioned in the gas flow channel and comprising, a first layer of rod-shaped elements positioned at a distance from one another along a plane transverse to a direction of gas flow, and a second layer of rod-shaped elements offset relative to the first layer and positioned at a distance from one another along the plane transverse to the direction of gas flow, wherein the rod-shaped elements are configured to extend across the gas flow channel, and wherein the second layer is configured to move relative to the first layer to define at least one of: (i) one or more additional operating positions; and (ii) an out-of-operation position, wherein the second layer is configured to move in a direction parallel to the gas flow direction, wherein the movement of the second layer is performed using one or more water-operated hydraulic cylinders, and wherein the one or more water-operated hydraulic cylinders are coupled to a flushing apparatus.

\* \* \* \* \*